Dec. 30, 1969 G. HUBERT 3,487,210

SIGNATURE COMPARISON SYSTEM

Filed Sept. 10, 1968

INVENTOR
GUSTAV HUBERT

BY HIS ATTORNEYS
HARRIS, KIECH, RUSSELL & KERN

3,487,210
SIGNATURE COMPARISON SYSTEM

Gustav Hubert, San Gabriel, Calif., assignor to Ultra-Violet Products, Inc., San Gabriel, Calif., a corporation of California Filed Sept. 10, 1968, Ser. No. 758,845
Int. Cl. G01d 7/06, 11/24
U.S. Cl. 250—78 6 Claims

ABSTRACT OF THE DISCLOSURE

Apparatus for comprising indicia, such as a signature in a savings account passbook or on a credit card with a signature on a check or withdrawal slip or sales ticket. A passbook or the like with a layer of fluoroescent material and a signature in phosphorescent material. Means for periodically illuminating the passbook with ultra-violet, with the phosphorescent signature glow being visible adjacent the second signature for comparison.

This invention relates to indicia verification and comparison systems and will be described as applied to a system for comparing the signature on an identification card with the signature on a sales ticket. Of course, it will be recognized that the invention is not limited to signatures as indicia nor to identification cards as carriers, but is equally applicable to various indicia applied to various carriers. A typical example of another use is a signature in a savings account passbook compared with a signature on a check or withdrawal slip.

The present invention is an improvement on that described in my co-pending application entitled Signature Verification System, Ser. No. 715,871, filed Mar. 25, 1968.

My co-pending application describes a passbook with a layer of fluoroescent material on a page, with the signature being applied in a phosphorescent material. The two materials are selected to have the same appearance under daylight so that the signature cannot be detached under ordinary viewing conditions. When the passbook is exposed to ultra-violet, the radiation from the fluoroescent material completely masks the radiation from the signature phosphorescent material. The phosphorescent signature is viewed by periodically exciting the materials with ultra-violet and then viewing the passbook after the ultra-violet is removed, with the phosphorescent glow making the signature readily visible. The duration of the fluorescent glow can be made quite short and the rate of exposure to ultra-violet illumination can be made quite high. Then when the passbook is exposed to the proper illuminating means, the signature appears visually constant, while exposure to other types of illumination produces no information.

The various forms and combinations for the passbook or other indicia carrier described in my co-pending application can be used with the present invention. The various forms of illuminating mechanism described in my co-pending application can be used with the present invention.

It is an object of the present invention to provide a new and improved signature comparison system which has all the advantages of my earlier system and which provides for direct and simultaneous comparison of the signature or other indicia on the passbook or other carrier with a second signature or indicia. The preferred embodiment to be illustrated and described herein below provides for direct and simultaneous viewing of a concealed signature on a credit card and of a signature on a sales ticket.

The invention also comprises novel details of construction and novel combinations and arrangements of parts, which will more fully appear in the course of the following description. The drawing merely shows and the description merely describes a preferred embodiment of the present invention which is given by way of illustration or example.

The apparatus includes a housing 10 mounted between the upstanding arms of a U-shaped bracket 11 which in turn is fixed to a base 12. The housing preferably is pivotally mounted in the bracket and is held in place by clamp nuts 14, which permit tilting of the housing to a comfortable viewing position for a specific location.

Figure 2:
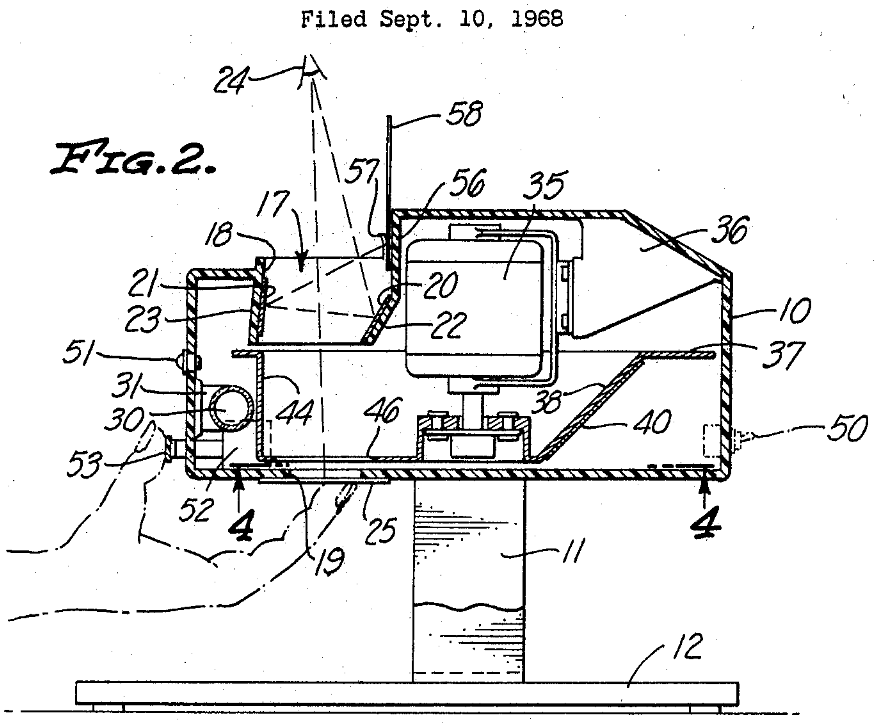
FIGURE 2 is a vertical sectional view taken along the line 2—2 of FIGURE 1, showing the mechanism in the viewing state.

A viewing passage 17 is provided in the housing between a viewing opening 18 and a carrier opening 19, to provide a line of sight from a viewer indicated at 24, to a card 25 positioned at the carrier opening 19, as illustrated in FIGURE 2.

A lamp 30 is mounted in conventional brackets 31 in the housing 10. The lamp is selected to provide an output of a wave length for exciting the fluorescent and phosphorescent materials used on the card 25 or other carrier. Typically this is a long wave ultra-violet lamp of conventional design.

An electric motor 35 is mounted on a bracket 36 within the housing and carries a wheel 37. The wheel has opposed sloping walls 38, 39, with a reflecting surface 40, 41, on the exterior of each sloping wall. The reflecting surfaces may comprise mirrors or polished metal plates or deposited metal films or other suitable devices. The wheel also has opposed rim portions 43, 44, and adjacent openings 45, 46.

A switch 50 is mounted in the housing and provides for turning the main power supply on and off. An indicator lamp 51 may be mounted in the front wall of the housing 10 to indicate when the switch 50 is turned on and the lamp 30 is energized. A motor control switch 52 may be mounted in the housing 10 and actuated by a push bar 53 projecting through the housing along the front wall. When the bar 53 is pushed inward, the switch 52 will be closed and the motor 35 energized to rotate the wheel 37.

Figures 1, 3, 4:
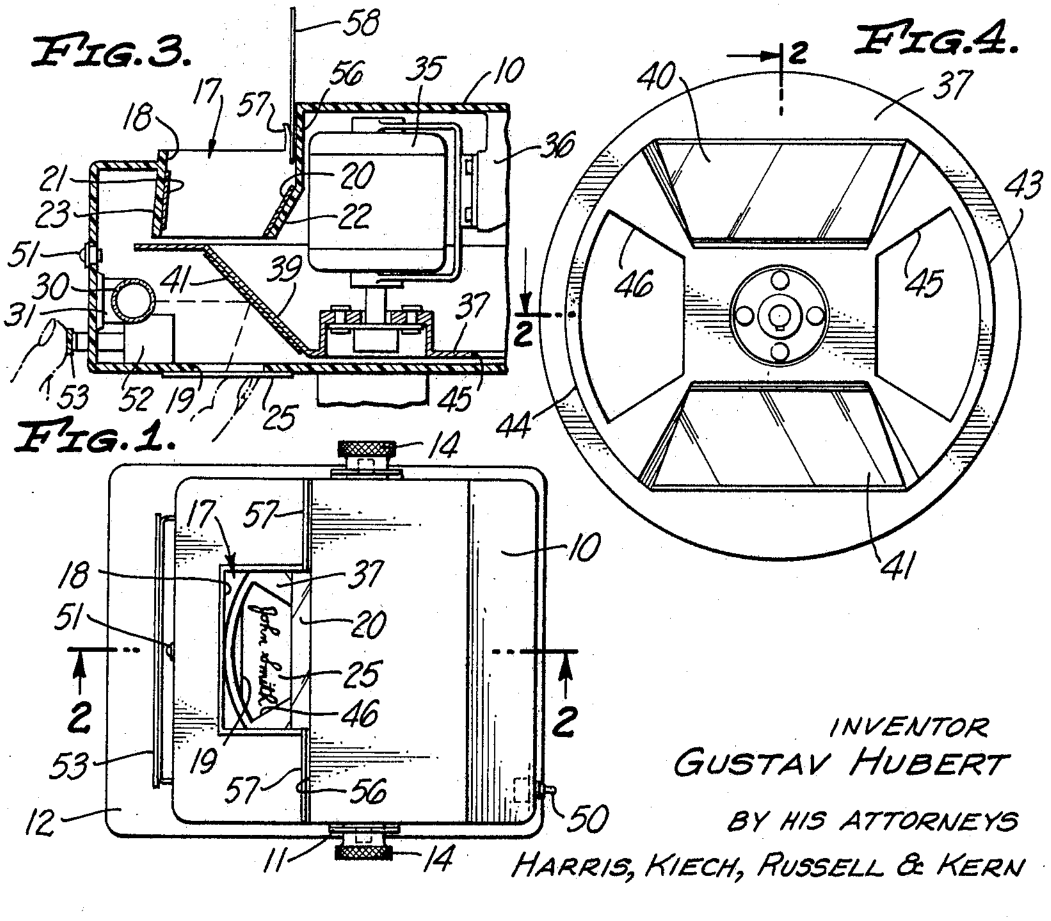
FIGURE 1 is a top view of an instrument incorporating a preferred embodiment of the invention.
FIGURE 3 is a partial view similar to that of FIGURE 2, showing the mechanism in the illuminating state.
FIGURE 4 is a bottom view of the rotating wheel. taken along the line 4—4 of FIGURE 2.

A card position is provided on the top of the housing and typically comprises a vertical wall 56 and a vertical member 57 defining an upwardly opening slot therebetween. The member 57 may be interrupted in the central portion of the housing so as not to restrict the view of the user in this area (see FIGURE 1). In FIGURE 2 and 3, a card 58 is shown positioned in the slot. Mirrors 20, 21 are mounted on opposite interior walls 22, 23, respectively, of the housing to provide a line of sight from the viewer at 24 to the card 58. With this arrangement, signatures on the cards 25 and 58 are substantially the same virtual distance from the eye of the viewer and size distortion due to distance is eliminated.

The word "card" is used in the specification and claims to refer to any object carrying a signature or other indicia to be used for comparison purposes. The card may be a check, a withdrawal slip, a sales ticket, an identification card, or any other similar item.

In use, the card or other item with the visible signature or other indicia is positioned in the slot at the top of the housing. The other card or carrier with the fluorescent and phosphorescent materials is positioned at or below the carrier opening 19, typically as illustrated in FIG- URES 2 and 3, whereby the user holds the carrier card in position with his fingers and operates the bar 53 with his thumb to energize the motor 35. As the wheel 37 is rotated, the light from the lamp 30 is reflected downward onto the carrier card while the viewing passage is blocked, as shown in FIGURE 3. Then the light of the lamp is blocked from the viewing passage and the user sees the phosphorescent radiation of the carrier and simultaneously sees the signature of other indicia on the card 58 in the mirror 20, as illustrated in FIGURE 2. The speed of rotation of the wheel may be made such that the viewer has the sensation of seeing the signature of the carrier card 25 continuously and directly below the signature of the card 58, permitting a rapid and exact comparison of the signatures.

At the same time, the security of the signature on the carrier card is maintained, since the signature cannot be seen in visible light nor when exposed to direct ultraviolet radiation.

Various other mechanisms can be utilized for providing the periodic illumination and those described in my co-pending application are readily usable. It will be understood that other applications of the invention are possible and that the embodiment disclosed may be subjected to various changes, modifications and substitutions without necessarily departing from the spirit of the invention.

I claim as my invention:

1. In an indicia verification system utilizing fluorescent and phosphorescent materials and including a carrier, a layer of one of the materials on the carrier, and an indicia in the other of the materials on the carrier in the zone of the layer, and means for periodically illuminating the layer with light of a wave length for exciting the materials, and including in combination:

a housing having means defining a carrier viewing path between a viewing opening and a carrier opening, said housing including first means defining a card position adjacent said viewing opening, a viewing mirror disposed in said viewing path adjacent said viewing opening, and second means for directing an image at said card position onto said viewing mirror;

a lamp for producing light of a wave length for exciting the materials of the carrier; and means for simultaneously blocking said viewing path and illuminating a carrier through said carrier opening, and then blocking illumination of said lamp from said path and permitting simultaneous viewing of a carrier through said carrier opening and of a card at said card position on said viewing mirror.

2. A system as defined in claim 1 in which the distance along said viewing path from a user to said carrier opening is substantially the same as the distance from the user to said card position via said viewing mirror and second means.

3. A system as defined in claim 2 in which said second means includes a second mirror for reflecting an image from said card position to said viewing mirror.

4. A system as defined in claim 1 in which said lamp is mounted in said housing, and including a reflector, and a motor for rotating said reflector to move said reflector through said path for sequentially directing light from said lamp along one direction of said path and then blocking lamp light from said path.

5. A system as defined in claim 1 in which said first means includes an upwardly opening slot in said housing adjacent said viewing opening for receiving a card.

6. A system as defined in claim 1 including a base, and a bracket carried on said base and engaging said housing for supporting said housing spaced upward from said base with said viewing opening adjacent the top of the housing and said carrier opening adjacent the bottom of the housing, providing manual access between said housing and base for positioning a carrier at said carrier opening.

References Cited

UNITED STATES PATENTS

| | | | |
|---|---|---|---|
| 2,459,693 | 1/1949 | Gordon | 250—71 |
| 2,975,966 | 3/1961 | Howard | 250—71 X |

RALPH G. NILSON, Primary Examiner

DAVIS L. WILLIAMS, Assistant Examiner

U.S. Cl. X.R.

250—71; 283—7

PO-1050
(5/69)

UNITED STATES PATENT OFFICE
CERTIFICATE OF CORRECTION

Patent No. 3,487,210 Dated December 30, 1969

Inventor(s) Gustav Hubert

It is certified that error appears in the above-identified patent and that said Letters Patent are hereby corrected as shown below:

Col. 1, 1.11 under Abstract of Disclosure, "comprising" should read --comparing--
Page 1, line 9 of specification;
1. 40 "detached" should read --detected--
Page 2, line 21 of specification.

Col. 2, 1.55 "Figure" should read --Figures--
Page 6, line 7 of specification.

SIGNED AND
SEALED
JUL 21 1970

(SEAL)
Attest:

Edward M. Fletcher, Jr.
Attesting Officer

WILLIAM E. SCHUYLER, JR.
Commissioner of Patents